No Printed Specification Available
9295X
J. CURTIS.
MILL FOR SEPARATING GOLD FROM ORE.
Patented Dec. 28, 1835.
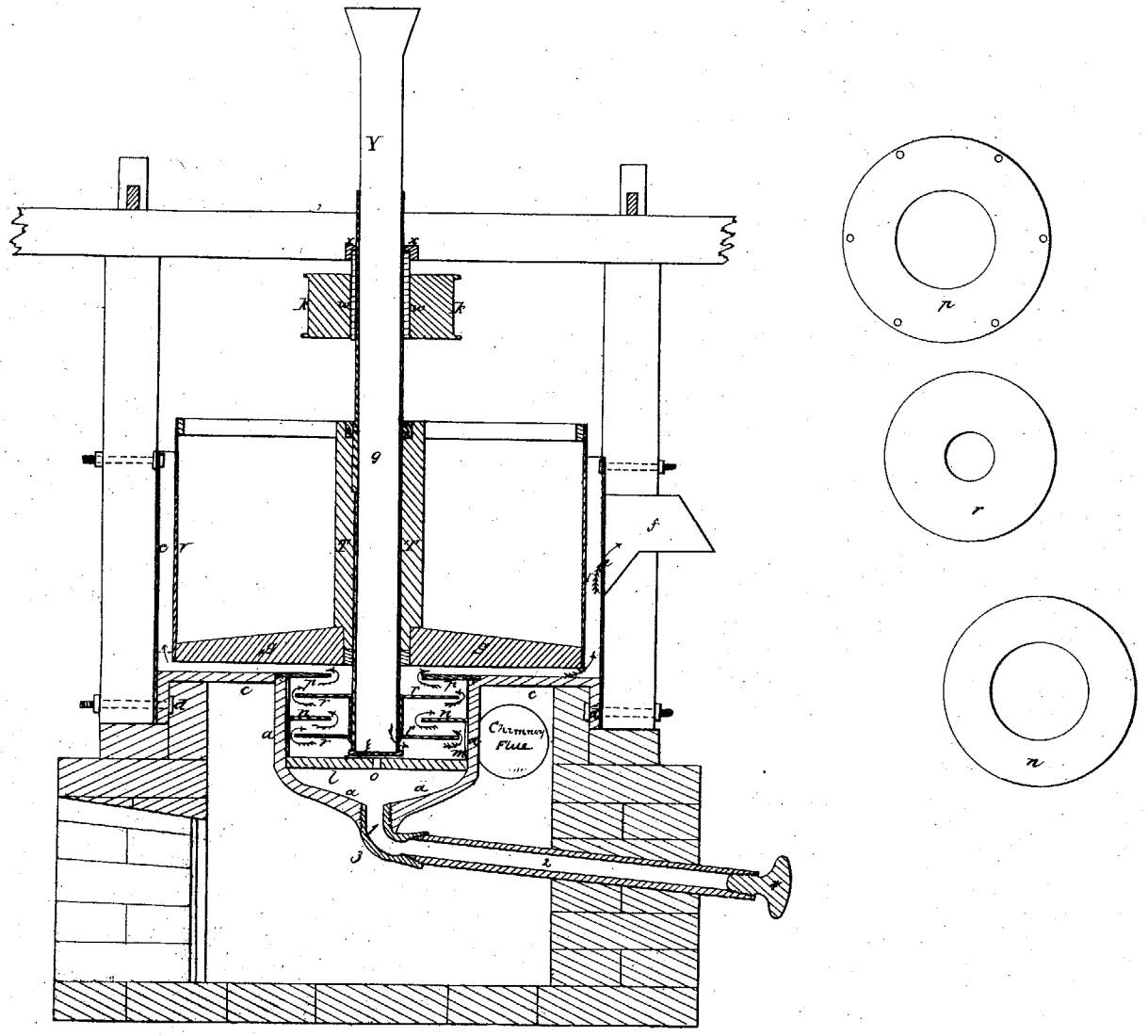
THE NORRIS PETERS CO., PHOTO-LITHO., WASHINGTON, D. C.

No Printed Specification Available
9295X
J. CURTIS.
MILL FOR SEPARATING GOLD FROM ORE.
Patented Dec. 28, 1835.
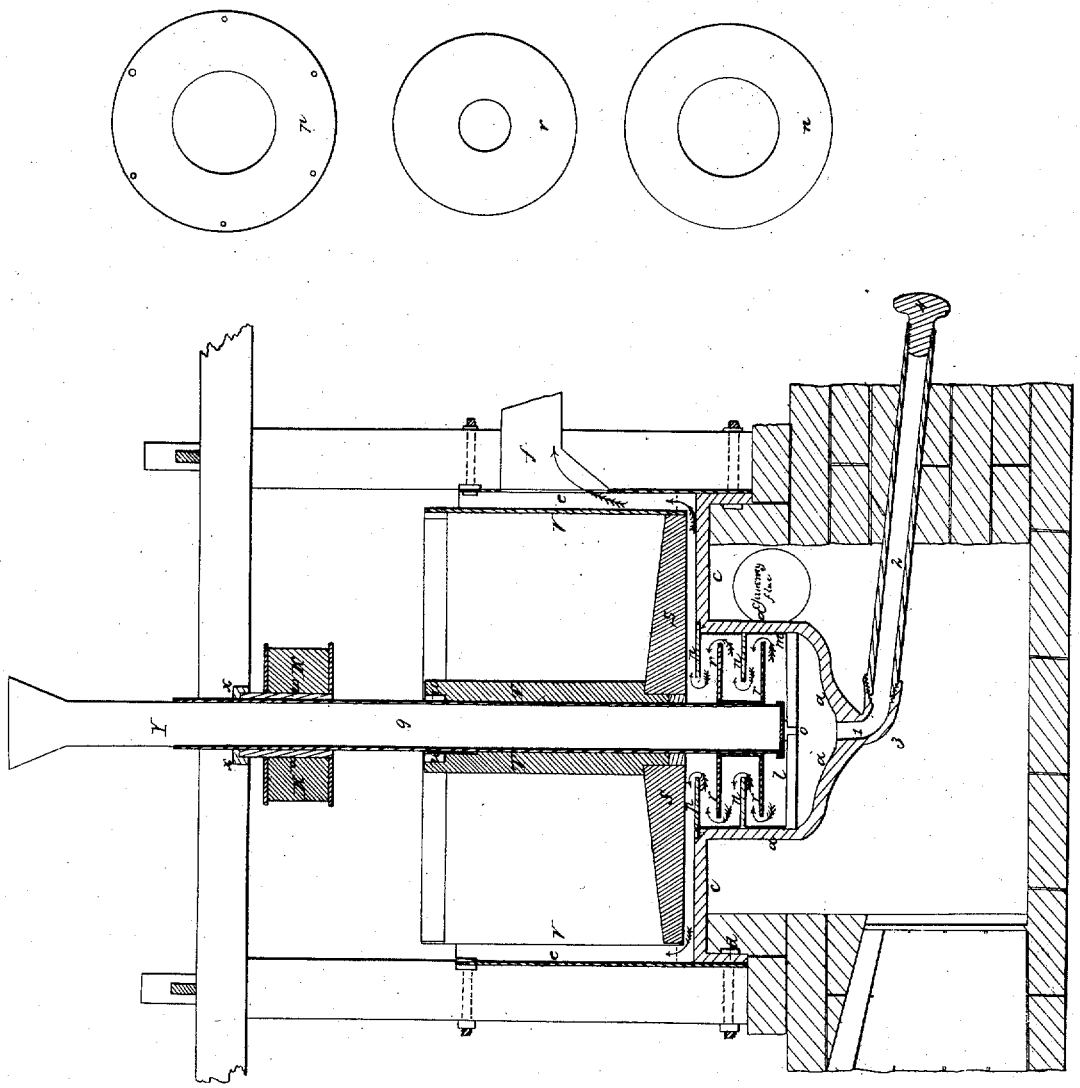
THE NORRIS PETERS CO., PHOTO-LITHO., WASHINGTON, D. C.

No Printed Specification Available
9295X
J. CURTIS.
MILL FOR SEPARATING GOLD FROM ORE.
Patented Dec. 28, 1835.
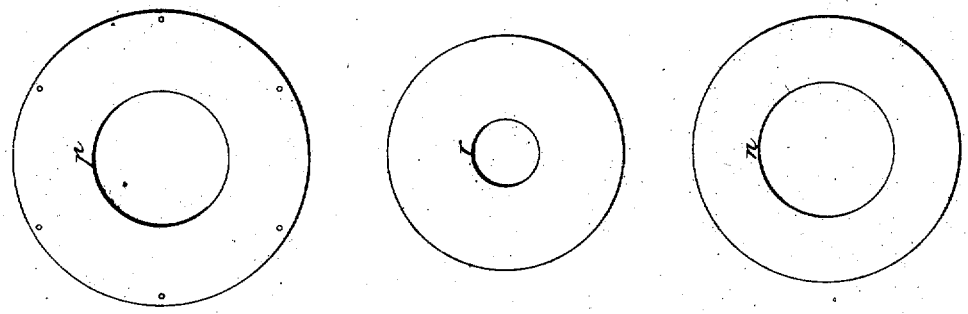
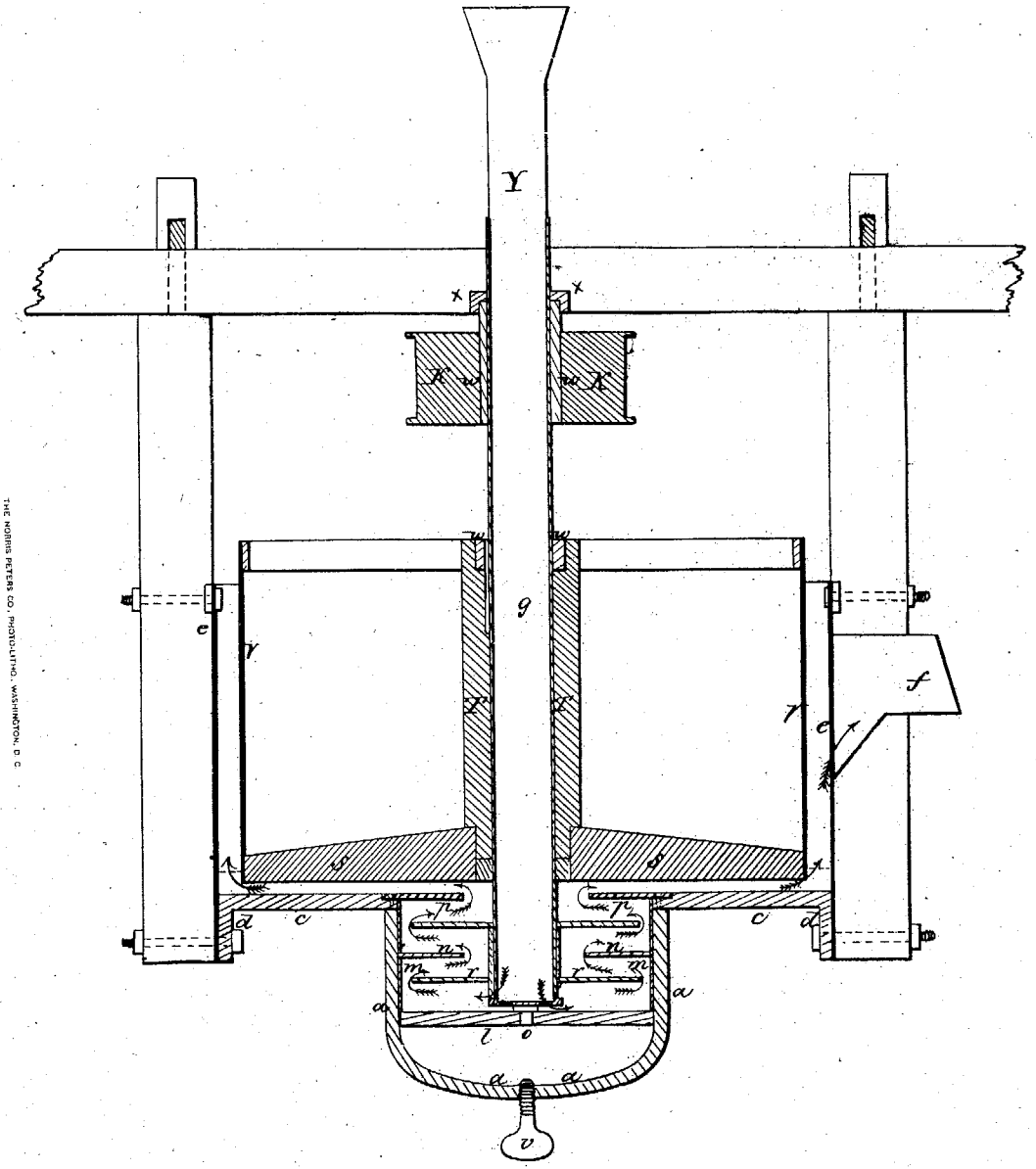
THE NORRIS PETERS CO., PHOTO-LITHO., WASHINGTON, D. C.

Joseph Curtis

The Schedule referred to in these Letters Patent and making part of the same, containing a description in the words of the said Joseph Curtis himself of his improvement in the Amalgam Mill for separating Gold from the Ore To all to whom these Presents shall come
Be it known that I Joseph Curtis have invented cer=tain new and useful improvements in an Amalgum Mill to take Gold from the Ore, and that the following is a full and exact description of the construction and operation of said Machine as invented by me.

A pot or bed piece made of cast iron 1/2 an Inch thick. the pot part a a 10 Inches diameter and 12½ deep to an aperture in the centre of an 1/2 Inch diameter to draw off the quicksilver by a cock or thumb-screw b from the edge of the pot. a a is a plain or flange c c 24 Inches diameter then a decending flange d d 2 Inches deep. To this flange is rivetted a cylinder of sheet Iron e e 1/8 of an inch thick and 14 Inches deep at the top and outer side is rivetted a wrought Iron hoop 1 Inch broad and 3/8 of an inch thick from this cylinder a place of discharge or spout f of sheet Iron 3 Inches square the upper part of which is within 2 Inches of the top (this spout may be contracted by means of blocks of wood as the quality of the ore may require A frame of timber say 3 Inches square for the uprights and 2½ Inches by 6 Inches for the cross pie-ces is required to support the tube g on which the pully h is attached for a band, this frame of timber is secured to the Mill by bolts and nutts passing through the descen-ding flange a. and the timber and also by two bolts

9295X and nutts passing through the wrought Iron hoop c (at the upper end of the cylinder) and the timber, In the pot within 2 inches of the bottom a wrought Iron bar, b, say one inch broad and half inch thick is horizontally placed the ends resting on the casting in a bed chipped for that purpose, in the centre of the bar is a hole half an inch in diametre to receive and support the revolving tube g which is of cast Iron 2¼ inch calabre and ⅛ of an inch thick and about 30 Inches long having the lower end capped by a wrought Iron plate with a vertical journal O that runs in the ½ Inch hole in the Iron bar.

Orifices of about 1/14 of an inch are made in the wrought cap and end of the tube below the lower re=volving plate equalling or nearly the sectional area of the tube, To secure the bar b in its place a wrought Iron hoop not rivetted m is put inside the pot the same being about 1/16 Inch thick and 2 Inches deep, on this rests the plate n, of 10 Inches diameter and ⅛ of an Inch thick having a round hole in the center of 5 Inches diameter this is secured to its place by another hoop similar to m (and in like manner as many plates as may be required) and the whole is secured by the upper plate P, 11 Inches in diameter which is secured in its place by small screws going into the pot.)

To the cast Iron tube 1 Inch from the bottom (resting on a small projection in the casting is a thin wrought iron hoop) shrunk to the tube is a sheet Iron plate, r ⅛ of an inch thick and 9 Inches diameter then a sheet iron hoop or sleve ⅛ of an inch thick and 2 inches broad then another plate similar to r all of which and more if required are bedded on by Keys or wedges S. is a floating revolver made of pine plank 2 Inches
thick and 22 Inches diameter the bottom of which is
covered with sheet copper, to keep this true and perfectly
level it is attached to a wood tube T. 1 1/2 Inches thick
and 14 Inches long that fits the tube but not so tight as
to prevent its rising and falling as the fluid may require
in the upper end of this tube is inserted an Iron box U (a
cart wheel box does well) a groove is chipped 1/10 of an
Inch square lengthwise of the box U. and a wrought Iron
feather or key about 4 Inches long is fitted to this groove
and secured to the cast Iron tube. To the outer edge of
this wooden revolver is attached a sheet iron cylinder 1/8
of an Inch thick and 12 Inches deep to stiffen this cylin
=der a wrought Iron hoop 1/4 or 3/8 of an Inch thick and
1 Inch broad is rivetted at the upper edge inside the cylin
=der V.

The pully W. for the band is permanently fitted with
a cast iron box W inside and projecting above the pully
say one inch which runs in the brasses X. fitted in the
cross beam. the cast iron box can be ajusted so as to
keep the tube in its place (which when the quicksilver
is in the pot is pressing upwards.

To the cast Iron tube a pipe of tin, Iron or
copper Y. with a tunnel top is inserted of sufficient length
to be equal to the hydrostatic power required which for
the Machine he named must be 60 Inches The quicksilver must fill the pot and say
1 Inch deep on the plain, or flange of 24 Inches.
The revolver which floats must have a weight of sand or
water inside to cause it to settle, say 1/2 an inch into
the quicksilver The Ore must be reduced to an impalpable

9295X powder either by dry or wet process, when prepared
for this mill it must be wet and conducted in a
running stream of water into the tunnel of the upper
tube whence it will find its way by its gravity through
the orifices in the lower end of the tube and through
the quicksilver to the discharge spout f. in the direc=
-tion of the arrows.

The intent of giving the centre part a
circular motion is to cause a more thorough distribu
-tion of the Ore and water among the mercury. The
quantity of ore to the measure of water depends on
the earthy state of the ore.

The revolutions of the Mill may be
supposed to average 16 a minute but all depends
on the quality of the Ore And I Joseph Curtis do hereby claim
as my invention the application of hydrostatic pressure
to the passing of Ore through a Stratum of quicksilver
by means of the Mechanical combination set forth
in the above described Mill or by any other combi
-nation that may be preferred Joseph Curtis Witnesses
J. R. Curtis
L. Gaylord Clark Exd
WGC (Drawing)

(1,3 00)